(12) United States Patent
Chen

(10) Patent No.: US 11,487,654 B2
(45) Date of Patent: Nov. 1, 2022

(54) METHOD FOR CONTROLLING WRITE BUFFER BASED ON STATES OF SECTORS OF WRITE BUFFER AND ASSOCIATED ALL FLASH ARRAY SERVER

(71) Applicant: Silicon Motion, Inc., Hsinchu County (TW)

(72) Inventor: Cheng-Ding Chen, Yunlin County (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 17/151,645

(22) Filed: Jan. 18, 2021

(65) Prior Publication Data
US 2021/0271595 A1 Sep. 2, 2021

Related U.S. Application Data

(60) Provisional application No. 62/983,766, filed on Mar. 2, 2020.

(51) Int. Cl.
*G06F 12/02* (2006.01)

(52) U.S. Cl.
CPC .. *G06F 12/0246* (2013.01); *G06F 2212/2022* (2013.01)

(58) Field of Classification Search
CPC ......... G06F 12/0246; G06F 2212/2022; G06F 2212/154; G06F 2212/214; G06F 2212/262; G06F 2212/286; G06F 2212/312; G06F 12/0868
See application file for complete search history.

(56) References Cited

U.S. PATENT DOCUMENTS

| 4,394,733 A * | 7/1983 | Swenson | G06F 12/0866 711/216 |
| 6,535,949 B1 * | 3/2003 | Parker | G06F 3/0679 711/159 |
| 9,239,796 B2 * | 1/2016 | Radu | G06F 12/0875 |
| 2007/0245074 A1 * | 10/2007 | Rosenbluth | G06F 12/0875 711/110 |
| 2009/0043948 A1 * | 2/2009 | Wittenburg | G06F 12/0246 711/E12.001 |
| 2010/0153660 A1 * | 6/2010 | Lasser | G06F 12/0246 711/E12.001 |
| 2011/0173395 A1 | 7/2011 | Bhattacharjee | |
| 2011/0320733 A1 * | 12/2011 | Sanford | G06F 12/0871 711/135 |
| 2018/0248813 A1 * | 8/2018 | Zheng | G06F 12/0868 |

(Continued)

FOREIGN PATENT DOCUMENTS

TW M369528 U1 11/2009

*Primary Examiner* — Tasnima Matin
(74) *Attorney, Agent, or Firm* — Winston Hsu

(57) ABSTRACT

The present invention provides a control method of a server, wherein the server includes a write buffer for temporarily storing data from an electronic device, the write buffer has a plurality of sectors, and the write buffer has a write pointer and a flush pointer; and the control method comprises: setting each sector to have one of a plurality of states comprising an empty state, a merging state, a need-flush state and a flushing state; and referring to a state of a specific sector indicted by the write pointer to determine if ignoring the specific sector to directly process a sector after the specific sector.

10 Claims, 9 Drawing Sheets

(56) References Cited

U.S. PATENT DOCUMENTS

| | | | |
|---|---|---|---|
| 2020/0125548 A1* | 4/2020 | Shergill | G06F 16/2282 |
| 2020/0250090 A1* | 8/2020 | Ware | G06F 12/12 |
| 2021/0089471 A1* | 3/2021 | Lu | G06F 9/45558 |

* cited by examiner

METHOD FOR CONTROLLING WRITE BUFFER BASED ON STATES OF SECTORS OF WRITE BUFFER AND ASSOCIATED ALL FLASH ARRAY SERVER

CROSS REFERENCE TO RELATED APPLICATIONS

This application claims the priority of U.S. Provisional Application No. 62/983,766, filed on Mar. 2, 2020, which is included herein by reference in its entirety.

BACKGROUND OF THE INVENTION

1. Field of the Invention

The present invention is related to memory control, and more particularly, to a method for performing data access management of an all flash array (AFA) server, and associated apparatus such as the AFA server, a control circuit thereof, etc.

2. Description of the Prior Art

A data storage server may be arranged to store user data of one or more users, and various control methods regarding the data storage server have been proposed in the related art in order to bring good user experience to the users. As non-volatile (NV) memories such as Flash memories have been widely applied to various data storage device such as solid state drives (SSDs), etc., it is proposed in the related art to implement the data storage server to be a non-volatile (NV) memory type data storage server using NV memories as storage media thereof, such as an AFA server having multiple SSDs installed therein. However, some problems may occur. For example, the management of accessing the Flash memory in any SSD of the multiple SSDs is complicated. To ensure that the access control of the Flash memory in this SSD conforms to associated specifications, the controller of the Flash memory in this SSD is usually equipped with some management mechanisms to properly manage the internal operations thereof. Although SSD manufactures may have tried to make SSDs seem to be a good solution for replacing hard disk drives (HDDs), some characteristics of the SSDs are quite different from that of the HDDs. As a result, the control methods mentioned above may become improper or invalid, causing the overall performance of the AFA server to be degraded. Thus, a novel method and associated architecture are needed for solving the problems without introducing any side effect or in a way that is less likely to introduce a side effect.

SUMMARY OF THE INVENTION

It is therefore an objective of the present invention to provide a control method of a server, to solve the above-mentioned problems.

According to one embodiment of the present invention, a server comprising a SSD and a node is disclosed. The node comprises a network module, a processor and a memory, wherein the network module is configured to communicate with an electronic device via network; and the memory comprises a ring buffer serving as a write buffer of the node, wherein the write buffer has a plurality of sectors, a size of each sector is equal to a write unit of the another electronic device; and the write buffer has a write pointer for indicating an end of the last written sector, and the write buffer has a flush pointer for indicating the sector whose data is ready for moving into the SSD. The processor sets each sector to have one of a plurality of states comprising an empty state, a merging state, a need-flush state and a flushing state, the sector having the empty state indicates that no data is stored in the sector, the sector having the merging state indicates that processor is loading other data from the SSD and merging the data stored in the sector with the other data loaded from the SSD, the sector having the need-flush state indicates that the sector whose data is ready for moving into the SSD, and the flushing state indicates that the processing is moving data of the sector into the SSD; and the processor further refers to a state of a specific sector indicted by the write pointer to determine if ignoring the specific sector to directly process a sector after the specific sector.

According to another embodiment of the present invention, a control method of a server is disclosed, wherein the server comprises a write buffer for temporarily storing data from another electronic device, the write buffer has a plurality of sectors, a size of each sector is equal to a write unit of the another electronic device; and the write buffer has a write pointer for indicating an end of the last written sector, and the write buffer has a flush pointer for indicating the sector whose data is ready for moving into a SSD; and the control method comprises: setting each sector to have one of a plurality of states comprising an empty state, a merging state, a need-flush state and a flushing state, wherein the sector having the empty state indicates that no data is stored in the sector, the sector having the merging state indicates that processor is loading other data from the SSD and merging the data stored in the sector with the other data loaded from the SSD, the sector having the need-flush state indicates that the sector whose data is ready for moving into the SSD, and the flushing state indicates that the processing is moving data of the sector into the SSD; and referring to a state of a specific sector indicted by the write pointer to determine if ignoring the specific sector to directly process a sector after the specific sector.

According to another embodiment of the present invention, a control method of a server is disclosed, wherein the server comprises a write buffer for temporarily storing data from another electronic device, the write buffer has a plurality of sectors, a size of each sector is equal to a write unit of the another electronic device; and the write buffer has a write pointer for indicating an end of the last written sector, and the write buffer has a flush pointer for indicating the sector whose data is ready for moving into a SSD; and the control method comprises: receiving data from an electronic device; determining if the write pointer is at a sector having empty state; if the sector indicated by the write pointer has the empty state, writing the data into the sector; if the sector indicated by the write pointer does not have the empty state, determining if the write pointer is at the sector having a merging state; if the sector indicated by the write pointer has the merging state, not writing the data into the write buffer until the sector changes to another state; if it is determined that the sector indicated by the write pointer does not have the merge state, determining if any sector, between the write pointer and the flush pointer, has the empty state; if it is determined that a sector between the write pointer and the flush pointer has the empty state, directly writing data into the sector having the empty state.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
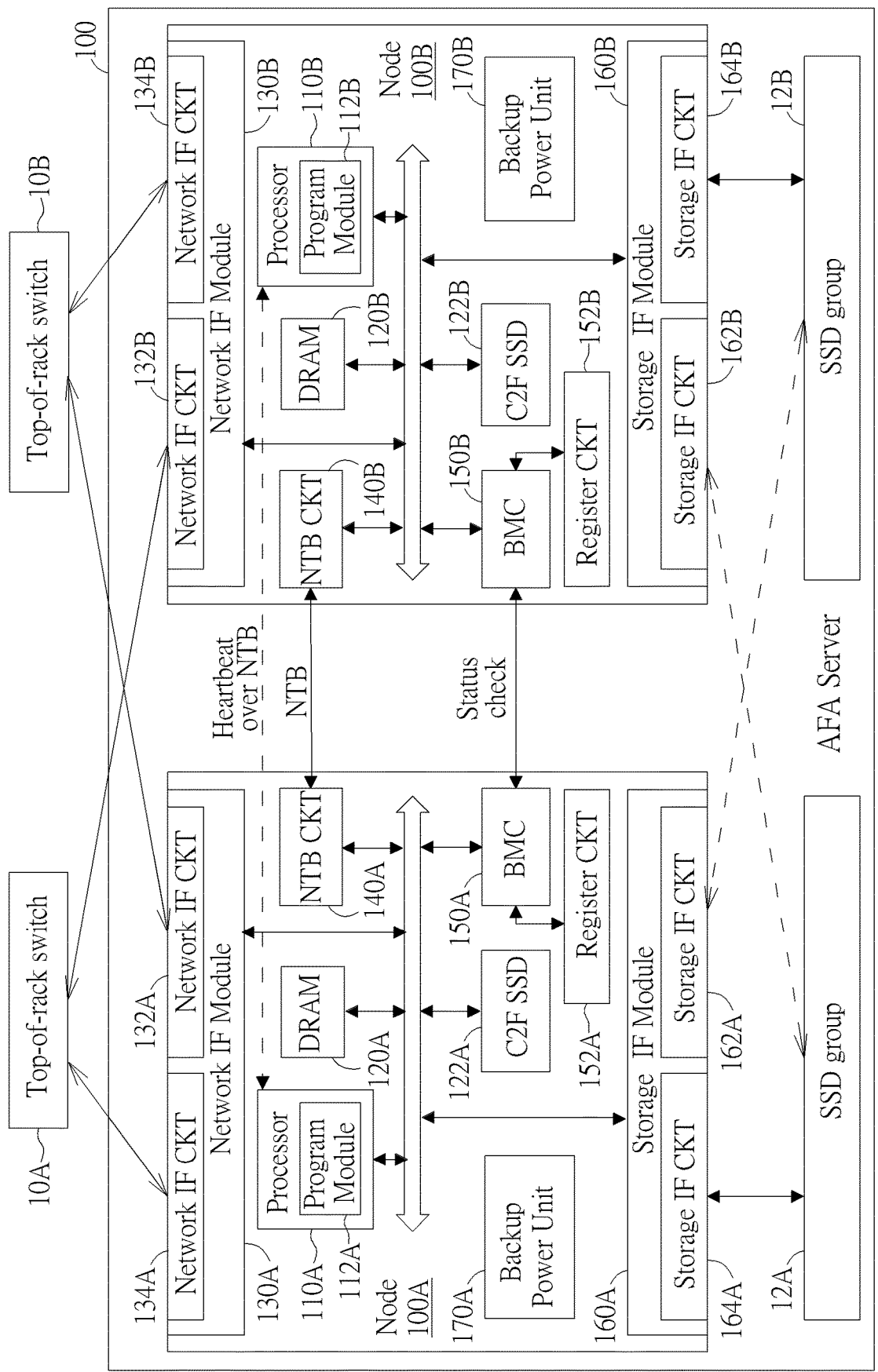
FIG. 1 is a diagram of an all flash array (AFA) server according to an embodiment of the present invention.

FIG. 1 is a diagram of an all flash array (AFA) server 100 according to an embodiment of the present invention. The AFA server 100 may comprise multiple nodes such as two nodes 100A and 100B, where any of the multiple nodes (e.g. one of the nodes 100A and 100B) may have the same or similar architecture as that of another of the multiple nodes (e.g. another of the nodes 100A and 100B). For example, the node 100A may comprise at least one processor (e.g. one or more processors such as one or more Central Processing Units (CPUs)) that may be collectively referred to as the processor 110A, and comprise a Dynamic Random Access Memory (DRAM) 120A, a Copy-to-Flash (C2F) SSD 122A, a network interface (IF) module 130A comprising one or more network interface circuits such as network interface circuits 132A and 134A (respectively labeled "Network IF CKT" for brevity), a Non-Transparent Bridge (NTB) module (or NTB) such as a NTB communications circuit 140A (labeled "NTB CKT" for brevity), a Board Management Controller (BMC) 150A, a register circuit 152A (labeled "Register CKT" for brevity) that is coupled to the BMC 150A, a storage interface (IF) module 160A comprising one or more storage interface circuits such as storage interface circuits 162A and 164A (respectively labeled "Storage IF CKT" for brevity), and a backup power source such as a backup power unit 170A (e.g. a battery), where at least one portion (e.g. a portion or all) of these components may be coupled to each other through a bus of the node 100A, but the present invention is not limited thereto. According to some embodiments, the architecture of the node 100A may vary.

Similarly, the node 100B may comprise at least one processor (e.g. one or more processors such as one or more CPUs) that may be collectively referred to as the processor 110B, and comprise a DRAM 120B, a C2F SSD 122B, a network interface (IF) module 130B comprising one or more network interface circuits such as network interface circuits 132B and 134B (respectively labeled "Network IF CKT" for brevity), a NTB module (or NTB) such as a NTB communications circuit 140B (labeled "NTB CKT" for brevity), a BMC 150B, a register circuit 152B (labeled "Register CKT" for brevity) that is coupled to the BMC 150B, a storage interface (IF) module 160B comprising one or more storage interface circuits such as storage interface circuits 162B and 164B (respectively labeled "Storage IF CKT" for brevity), and a backup power source such as a backup power unit 170B (e.g. a battery), where at least one portion (e.g. a portion or all) of these components may be coupled to each other through a bus of the node 100B, but the present invention is not limited thereto. According to some embodiments, the architecture of the node 100B may vary.

As shown in FIG. 1, the AFA server 100 may further comprise multiple SSDs coupled to the nodes 100A and 100B, such as the SSD groups 12A and 12B. The SSD groups 12A and 12B may be coupled to the nodes 100A and 100B, and may be respectively linked to the nodes 100A and 100B by default, where the dashed lines between the nodes 100A and 100B and the SSD groups 12B and 12A may indicate optional links. For example, the node 100A may utilize the storage interface module 160A to activate the link between the storage interface circuits 164A and the SSD group 12A, for accessing data in the SSD group 12A, and the node 100B may utilize the storage interface module 160B to activate the link between the storage interface circuits 164B and the SSD group 12B, for accessing data in the SSD group 12B. When there is a need, the linking relationships between the nodes 100A and 100B and the SSD groups 12A and 12B may vary. For example, the node 100A may utilize the storage interface module 160A to activate the link between the storage interface circuits 162A and the SSD group 12B, for accessing data in the SSD group 12B, and the node 100B may utilize the storage interface module 160B to activate the link between the storage interface circuits 162B and the SSD group 12A, for accessing data in the SSD group 12A.

The processor 110A running program modules 112A can be configured to control operations of the node 100A. The DRAM 120A can be configured to buffer data (e.g. data to be written into the SSD group 12A), and the C2F SSD 122A can be configured to copy buffered data in the DRAM 120A to a Flash memory within the C2F SSD 122A, to prevent data loss of the buffered data when there is a need. For example, the C2F SSD 122A can be implemented by way of an expansion card mounted on a main circuit board (e.g. main board or motherboard) within the node 100A, such as an M.2 module (e.g. a circuit board having a connector conforming to M.2 specification), where the C2F SSD 122A may comprise a memory controller, one or more Flash memory chips, etc., but the present invention is not limited thereto. In addition, the network interface module 130A comprising the network interface circuits 132A and 134A can be configured to couple the node 100A (e.g. the processor 110A, the DRAM 120A, etc. on the main circuit board therein) to at least one network (e.g. Local Area Network (LAN), Wide Area Network (WAN), Internet, etc.) through at least one network switch such as top-of-rack (TOR) switches 10A and 10B. Additionally, the storage interface module 160A comprising the storage interface circuits 162A and 164A can be configured to couple the node 100A (e.g. the processor 110A, the DRAM 120A, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide a storage service to users through the node 100A.

Similarly, the processor 110B running program modules 112B can be configured to control operations of the node 100B. The DRAM 120B can be configured to buffer data (e.g. data to be written into the SSD group 12B), and the C2F SSD 122B can be configured to copy buffered data in the DRAM 120B to a Flash memory within the C2F SSD 122B, to prevent data loss of the buffered data when there is a need. For example, the C2F SSD 122B can be implemented by way of an expansion card mounted on a main circuit board (e.g. main board or motherboard) within the node 100B, such as an M.2 module (e.g. a circuit board having a connector conforming to M.2 specification), where the C2F SSD 122B may comprise a memory controller, one or more Flash memory chips, etc., but the present invention is not limited thereto. In addition, the network interface module 130B comprising the network interface circuits 132B and 134B can be configured to couple the node 100B (e.g. the processor 110B, the DRAM 120B, etc. on the main circuit board therein) to at least one network (e.g. LAN, WAN, Internet, etc.) through at least one network switch such as the top-of-rack (TOR) switches 10A and 10B. Additionally, the storage interface module 160B comprising the storage interface circuits 162B and 164B can be configured to couple the node 100B (e.g. the processor 110B, the DRAM 120B, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide the storage service to the users through the node 100B.

Regarding communications between the node 100A and its peer node such as the node 100B, the NTB module such as the NTB communications circuit 140A can be configured to communicate with a corresponding NTB module such as the NTB communications circuit 140B through a NTB path (labeled "NTB" for brevity) between the nodes 100A and 100B, to synchronize data and storage statuses of the nodes 100A and 100B and make them identical. Similarly, regarding communications between the node 100B and its peer node such as the node 100A, the NTB module such as the NTB communications circuit 140B can be configured to communicate with a corresponding NTB module such as the NTB communications circuit 140A through the NTB path between the nodes 100A and 100B, to synchronize data and storage statuses of the nodes 100A and 100B and make them identical. More particularly, the NTB modules such as the NTB communications circuit 140A and 140B can provide a function of a transport bridge between the nodes 100A and 100B and separate respective addresses domains of the nodes 100A and 100B, for facilitating communications between the nodes 100A and 100B without any address confliction. For example, the respective buses of the nodes 100A and 100B may conform to Peripheral Component Interconnect Express (PCIe) specification, and the NTB module of each node of the nodes 100A and 100B may be regarded as an endpoint of the node, where the nodes 100A and 100B may communicate and share devices with each other through the transport bridge, but the present invention is not limited thereto. According to some embodiments, the NTB modules such as the NTB communications circuit 140A and 140B can be implemented by way of a customized network interface circuit, for controlling the nodes 100A and 100B to communicate with each other as if they are communicating through network interface circuits.

Under control of the processor 110A running program modules 112A and the processor 110B running program modules 112B, the nodes 100A and 100B can maintain and monitor heartbeats over the NTB to determine peer node availability, for performing high availability (HA) control. For example, the node 100B can be configured to send a heartbeat signal to the node 100A, and the node 100A can be configured to detect and monitor the heartbeat signal from the node 100B to determine the availability of the node 100B, where whether the heartbeat signal from the node 100B exists may indicate whether the node 100B is available (or healthy). For another example, the node 100A can be configured to send a heartbeat signal to the node 100B, and the node 100B can be configured to detect and monitor the heartbeat signal from the node 100A to determine the availability of the node 100A, where whether the heartbeat signal from the node 100A exists may indicate whether the node 100A is available (or healthy). Based on the architecture shown in FIG. 1, when one of the nodes 100A and 100B is unavailable, the other of the nodes 100A and 100B can continue provide the storage service of the AFA server 100 for the users.

Please note that the AFA server 100 is equipped with more than one inter-node communications path. In addition to the NTB path, the AFA server 100 can be configured to have one or more additional communications paths such as a BMC path between the BMCs 150A and 150B, where the BMC 150A can be configured to manage at least one portion (e.g. a portion or all) of the hardware layer of the node 100A, and the BMC 150B can be configured to manage at least one portion (e.g. a portion or all) of the hardware layer of the node 100B. Regarding communications between the node 100A and its peer node such as the node 100B, the BMC 150A can be configured to communicate with the BMC 150B through the BMC path to access (e.g. read or write) one or more register values of one or more registers in the register circuit 152B, for performing status check, etc. on the node 100B. Similarly, regarding communications between the node 100B and its peer node such as the node 100A, the BMC 150B can be configured to communicate with the BMC 150A through the BMC path to access (e.g. read or write) one or more register values of one or more registers in the register circuit 152A, for performing status check, etc. on the node 100A. More particularly, the BMCs 150A and 150B can manage the respective hardware layer of the nodes 100A and 100B independently, having no need to rely on the processors 110A and 110B. For example, the BMC 150A can take care of unfinished works of the node 100A when the processor 110A malfunctions, and the BMC 150B can take care of unfinished works of the node 100B when the processor 110B malfunctions, but the present invention is not limited thereto. According to some embodiments, the BMCs 150A and 150B can be configured to take over the nodes 100A and 100B, respectively, to perform emergency processing to reduce the probability of data loss.

According to this embodiment, the AFA server 100 can be configured to be powered by multiple types of power sources. Each node of the nodes 100A and 100B may comprise at least one main power source (e.g. at least one power supply), for providing power to other components of the node in a normal power condition of the main power source. For example, the main power source of the node 100A can provide power to the main circuit board of the node 100A, and the main power source of the node 100B can provide power to the main circuit board of the node 100B. When an abnormal power condition of one or more nodes (e.g. the node 100A and/or the node 100B) is detected, one or more associated backup power sources (e.g. the backup power unit 170A and/or the backup power unit 170B) in the AFA server 100 can be configured to provide backup power. For example, the backup power unit 170A can provide power to the main circuit board of the node 100A (e.g. the processor 110A, the DRAM 120A, the C2F SSD 122A, the NTB communications circuit 140A, the BMC 150A, the register circuit 152A, etc.) when power failure of the main power source of the node 100A occurs, and the backup power unit 170B can provide power to the main circuit board of the node 100B (e.g. the processor 110B, the DRAM 120B, the C2F SSD 122B, the NTB communications circuit 140B, the BMC 150B, the register circuit 152B, etc.) when power failure of the main power source of the node 100B occurs.

According to some embodiments, each node of the nodes 100A and 100B (e.g. each of the respective main circuit boards of the nodes 100A and 100B) may further comprise sensors/detectors configured to perform detection on at least the components of the node to generate detection results (e.g. status obtained from any of the sensors/detectors). For example, a power detection result of the detection results may represent the power status of the main power source of the node, and more particularly, may indicate whether the abnormal power condition of the node occurs, for triggering the node to activate the backup power source (e.g. the backup power unit 170A or the backup power unit 170B) to provide the backup power.

Figure 2:
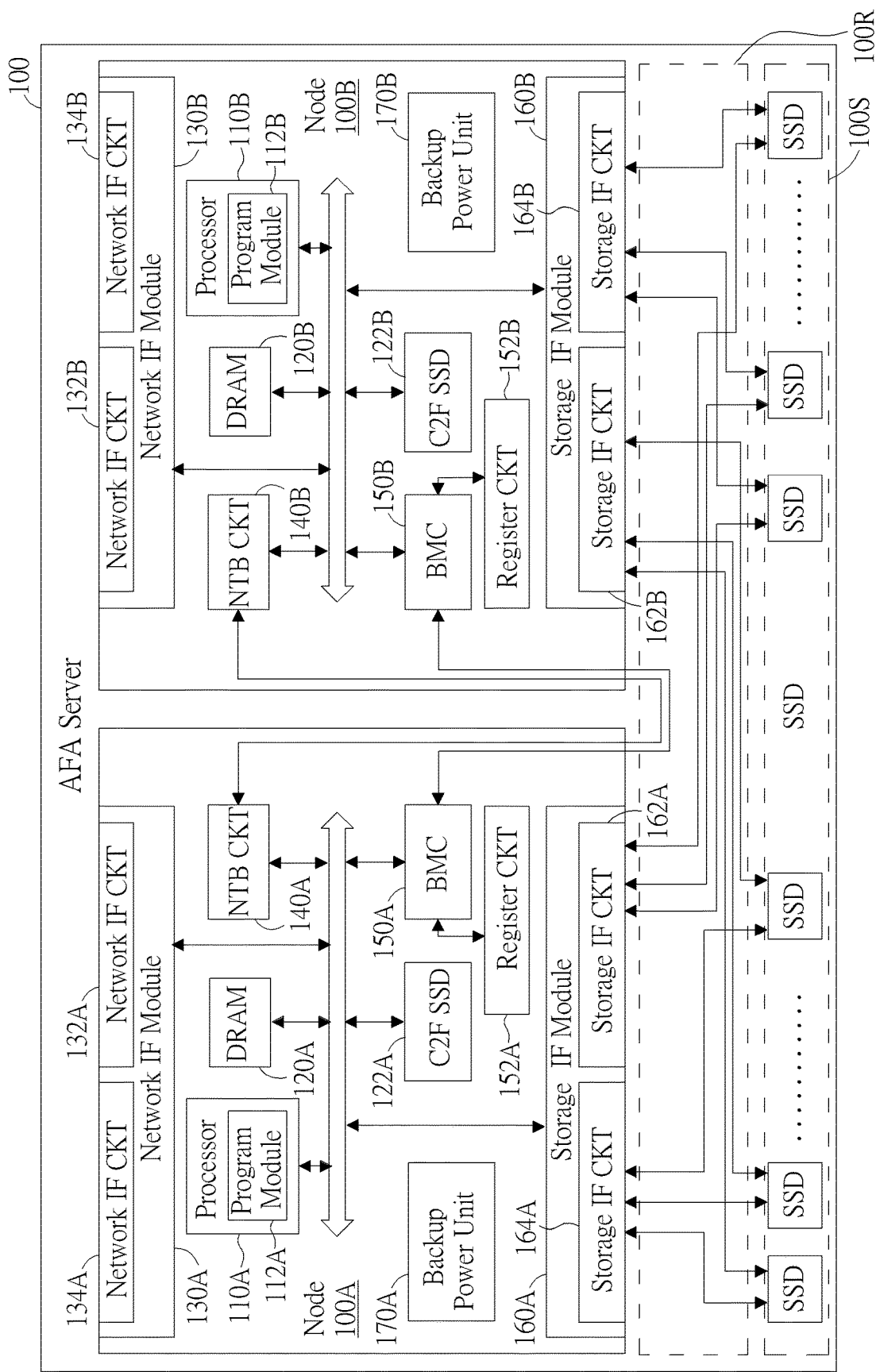
FIG. 2 illustrates some implementation details of the AFA server shown in FIG. 1 according to an embodiment of the present invention.

FIG. 2 illustrates some implementation details of the AFA server 100 shown in FIG. 1 according to an embodiment of the present invention, where the SSDs 100S can be taken as an example of the multiple SSDs mentioned in the embodiment shown in FIG. 1. In addition to the nodes 100A and 100B and the SSDs 100S, the AFA server 100 may further comprise a backplane circuit 100R. The backplane circuit 100R can be configured to electrically connect the SSDs 100S such as the SSD groups 12A and 12B to the nodes 100A and 100B. For example, the backplane circuit 100R can be implemented by way of a backplane circuit board having associated connectors, etc. In addition, a partial path of the NTB path between the NTB communications circuits 140A and 140B and a partial path of the BMC path between the BMCs 150A and 150B can be implemented within the backplane circuit 100R. As each of the NTB path and the BMC path does not pass through any cable which may be easily damaged, the communications paths between the nodes 100A and 100B are robust, and therefore, the nodes 100A and 100B can maintain effective communications and associated control to guarantee overall performance of the AFA server 100.

According to some embodiments, each of the SSDs 100S can be a single port SSD, and more particularly, can be a single port device based SSD. In addition, with aid of the backplane circuit 100R, the AFA server 100 can support hot-plug of any of the SSDs 100S.

According to some embodiments, one of the two nodes 100A and 100B may play a role of an active node in a high availability (HA) architecture of the AFA server 100, and another of the two nodes 100A and 100B may play a role of a standby node in the HA architecture of the AFA server 100. The two nodes 100A and 100B such as the active node and the standby node may interact with each other, and more particularly, may exchange node information through at least two communications paths such as the NTB path between the NTB communications circuits 140A and 140B and the BMC path between the BMCs 150A and 150B, and may synchronize data through the NTB path, but the present invention is not limited thereto. According to some embodiments, the AFA server 100 can be equipped with more than two inter-node communications paths.

Figure 3:
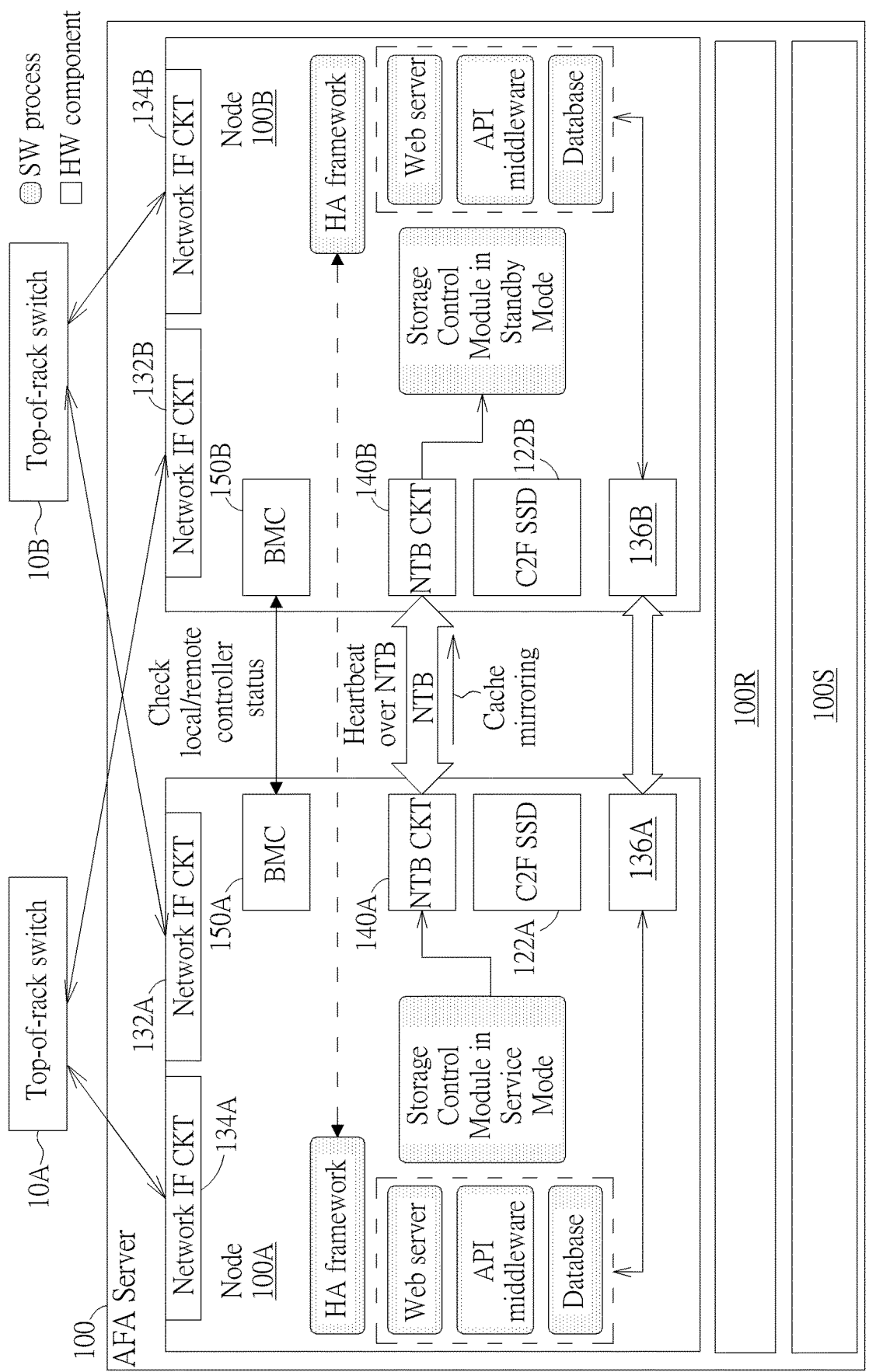
FIG. 3 illustrates a dual node architecture of the AFA server shown in FIG. 1 according to an embodiment of the present invention.

FIG. 3 illustrates a dual node architecture of the AFA server 100 shown in FIG. 1 according to an embodiment of the present invention. According to this embodiment, the nodes 100A and 100B can be configured to play the role of the active node and the role of the standby node, respectively, but the present invention is not limited thereto. For example, the nodes 100A and 100B can exchange their roles when there is a need. As shown in FIG. 3, in addition to some hardware (HW) components such as a portion of the components in the architecture shown in FIG. 1 or FIG. 2, some software (SW) processes such as HA framework processes, Web server processes, Database processes, a Storage Control Module process operating in a Service Mode and a Storage Control Module process operating in a Standby Mode (respectively labeled "HA framework", "Web server", "Database", "Storage Control Module in Service Mode" and "Storage Control Module in Standby Mode" for brevity) may be illustrated to indicate the associated interactions in the AFA server 100. The names of the processes described above indicate the associated functions thereof, respectively.

The software processes running on the node 100A (e.g. the HA framework process, the Web server process, the Database process, and the Storage Control Module process operating in the Service Mode) can be taken as examples of the program modules 112A, and the software processes running on the node 100B (e.g. the HA framework process, the Web server process, the Database process, and the Storage Control Module process operating in the Standby Mode) can be taken as examples of the program modules 112B, but the present invention is not limited thereto. In addition, the one or more network interface circuits of the network interface module 130A may further comprise a network interface circuit 136A, and the one or more network interface circuits of the network interface module 130B may further comprise a network interface circuit 136B. Thus, the AFA server 100 can be equipped with at least three inter-node communications paths such as the NTB path, the BMC path, and the network path between the network interface circuits 136A and 136B. For example, the nodes 100A and 100B can be configured to perform cache mirroring through the NTB path, check local/remote controller statuses through the BMC path, and perform additional communications operations through the network path between the network interface circuits 136A and 136B.

Figure 4:
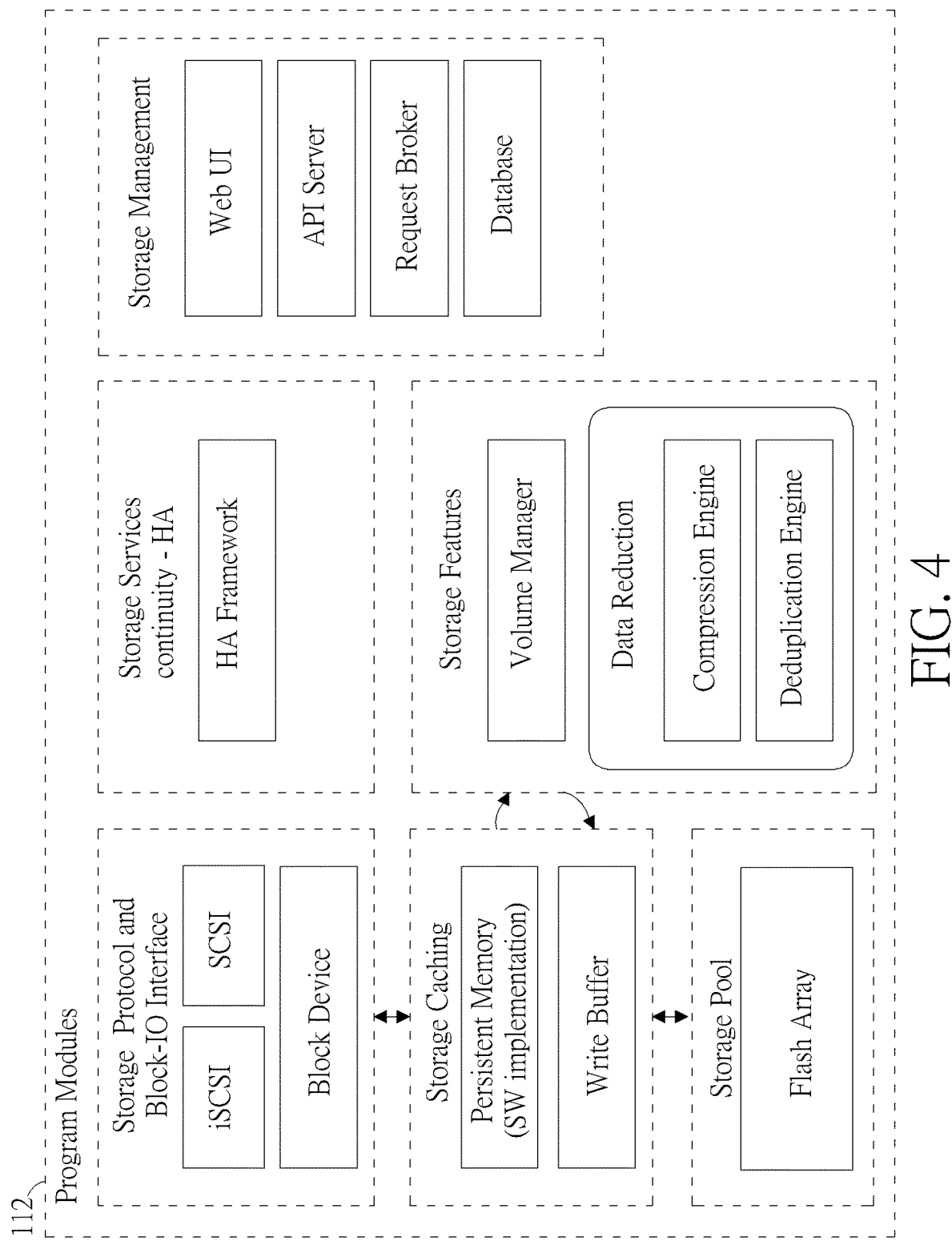
FIG. 4 illustrates some program modules in any of the nodes shown in FIG. 1 according to an embodiment of the present invention.

FIG. 4 illustrates some program modules 112 in any (e.g. each) of the nodes 100A and 100B shown in FIG. 1 according to an embodiment of the present invention. For example, the program modules 112 may represent the program modules 112A running on the processor 110A of the node 100A or the program modules 112B running on the processor 110B of the node 100B. As shown in FIG. 4, the program modules 112 may comprise some primary program modules such as a Storage Protocol and Block-Input/Output (10) Interface module, a Storage Caching module, a Storage Pool module, a Storage Services continuity—HA module, a Storage Features module and a Storage Management module (respectively labeled "Storage Protocol and Block-IO Interface", "Storage Caching", "Storage Pool", "Storage Services continuity—HA", "Storage Features" and "Storage Management" for brevity), where any of the primary program modules may comprise one or more sub-modules. In addition, the arrows between some of the program modules 112 indicate that they can interact with each other among multiple layers of program modules. For example, the Storage Protocol and Block-IO Interface module can be regarded as an upper layer (e.g. an upper layer program module) above the Storage Caching module, the Storage Pool module can be regarded as a lower layer (e.g. a lower layer program module) below the Storage Caching module, and the Storage Features module and the Storage Caching module can be arranged in an intermediate layer to be intermediate layer program modules, where the Storage Protocol and Block-IO Interface module and the Storage Pool module can be configured to interact with the client device and the SSD group, but the present invention is not limited thereto. When there is a need, the node can trigger other program modules to interact with one or more of these program modules.

The Storage Protocol and Block-IO Interface module may comprise some sub-modules such as a Small Computer System Interface (SCSI) module, an Internet SCSI (iSCSI) module and a Block Device module (respectively labeled "SCSI", "iSCSI" and "Block Device" for brevity). The Storage Caching module may comprise some sub-modules such as a Persistent Memory using SW implementation module and a Write Buffer module (respectively labeled "Persistent Memory (SW implementation)" and "Write Buffer" for brevity). The Storage Pool module may comprise a sub-module such as a Flash Array module (labeled "Flash Array for brevity). The Storage Services continuity—HA module may comprise a sub-module such as a HA Framework module (labeled "HA Framework for brevity). The Storage Features module may comprise some sub-modules such as a Volume Manager module and a Data Reduction module (respectively labeled "Volume Manager" and "Data Reduction" for brevity), where the Data Reduction module may comprise some sub-modules such as a Compression Engine module and a Deduplication Engine module, which may be respectively referred to as the Compression Engine and the Deduplication Engine. The Storage Management module may comprise some sub-modules such as a Web User Interface (UI) module, an Application Programming Interface (API) Server module, a Request Broker module and a Database module (respectively labeled "Web UI", "API Server", "Request Broker" and "Database" for brevity). The names of the modules described above indicate the associated functions thereof, respectively.

According to some embodiments, the AFA server 100 (e.g. the active node, such as one of the nodes 100A and 100B) can be configured to receive requests such as a write request, a read request, etc. from a client device outside the AFA server 100, and operate in response to the requests, respectively.

Figure 5:
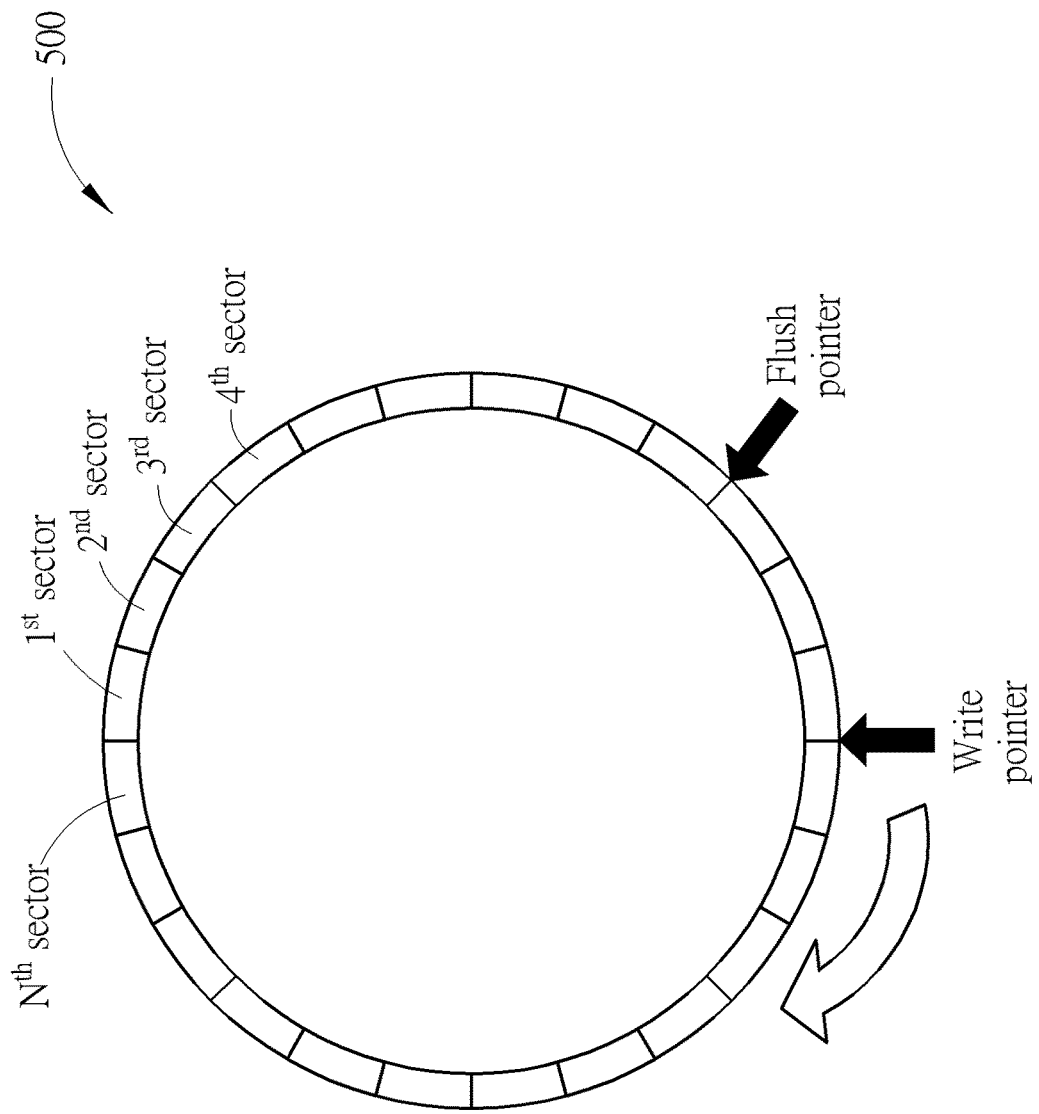
FIG. 5 shows a write buffer according to one embodiment of the present invention.

For the write request from the client device outside the AFA server 100, the processor 110A may assign a write buffer within the DRAM 120A for temporarily storing data from the client device. FIG. 5 shows a write buffer 500 according to one embodiment of the present invention. As shown in FIG. 5, the write buffer 500 comprises N sectors, wherein the N-th sector is connected to the first sector, that is the write buffer 500 has no real end. The write buffer 500 has a write pointer for indicating the end of the last written sector or the beginning of the empty sectors. Specifically, the write buffer 500 sequentially stores the data from the client device via the TOR switch 10A/10B, and assuming that the write pointer indicates the end of the 5th sector, the processor 110A can write the data into the 6th sector is the 6th sector is empty. After the 6th sector is written by the processor 110A, the write pointer moves to the end of the $6^{th}$ sector. It is noted that if all of the sectors within the write buffer are empty, the write pointer is only used to indicate the beginning of the empty sectors (i.e. the sector used to stored next data); and if all of the sectors within the write buffer are full of data, the write pointer is only used to indicate the end of the last written sector. In addition, the write buffer 500 further has a flush pointer indicating the sector whose data is ready for moving into the SSDs 100S. For example, if the flush pointer indicates the $8^{th}$ sector and the $8^{th}$ sector has data stored therein, it means that the processor 110A can move the data stored in the 8th sector into the SSDs 100S in an appropriate time. After the data of the 8th sector is moved to the SSDs 100S, the flush pointer moves to the $9^{th}$ sector. It is noted that the flush pointer moves step by step.

In this embodiment, a size of each sector of the write buffer 500 is equal to a write unit such as 4 kilobytes. In addition, the data stored in the same sector corresponds to the same logical address of the client device, that is the data stored in one sector corresponds to only one logical address.

The conventional write pointer and the flush pointer are moved step by step. The embodiment of the present invention provides a write mechanism to improve the efficiency of the data writing procedure.

Figure 6:
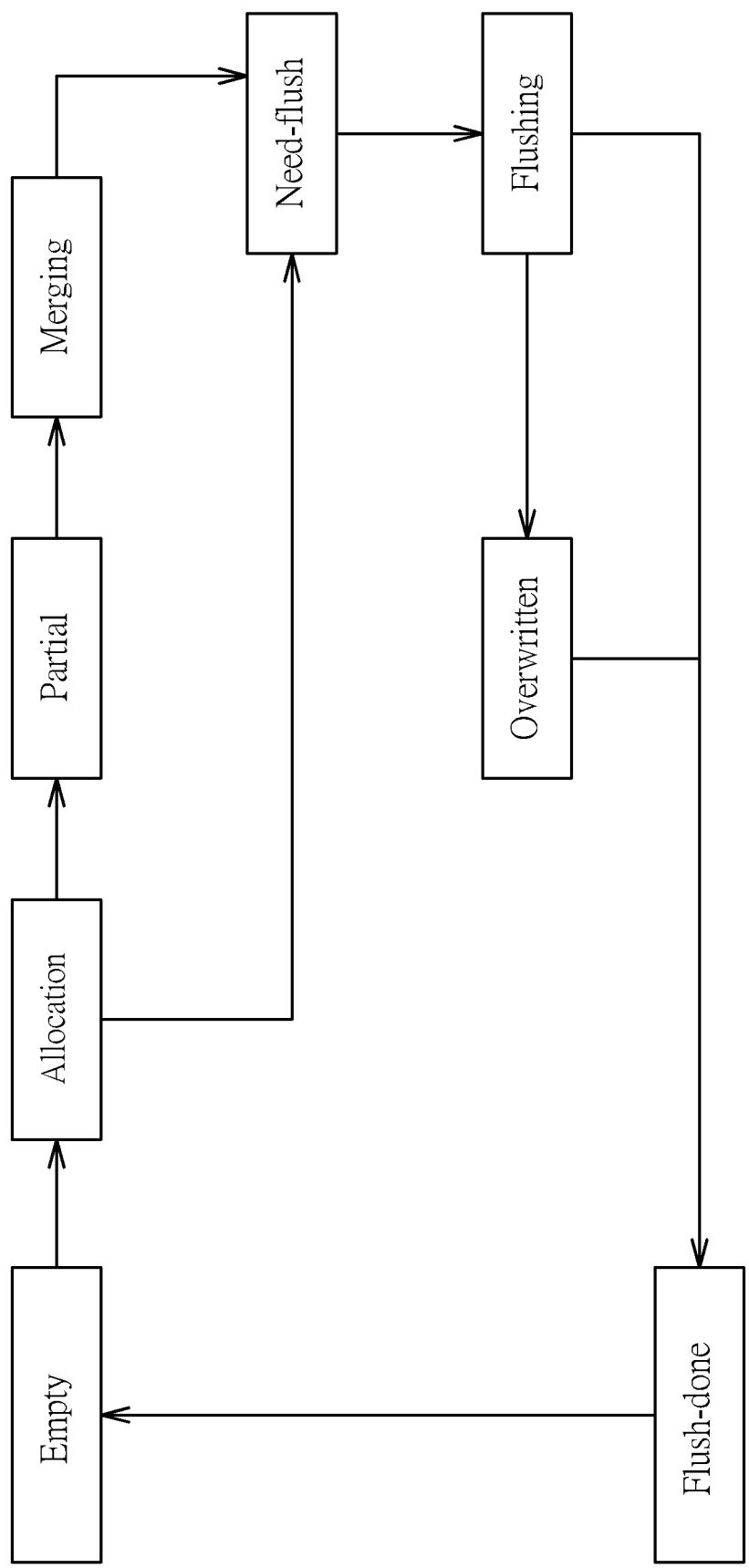
FIG. 6 is a state machine according to one embodiment of the present invention.

In this embodiment, each sector is assigned to have one of the states. FIG. 6 is a state machine according to one embodiment of the present invention. As shown in FIG. 6, the sector may have an empty state, an allocation state, a partial state, a merging state, a need-flush state, a flushing state, an overwritten state and a flush-down state. The empty state indicates that the sector does not have any data stored therein, that is the sector is allowed to store data from the client device. The allocation state indicates that the sector is storing the data from the client device. The partial state indicates that the valid data stored in the sector is less than the write unit (e.g. 4 kilobytes). Specifically, if the node 100A receives 512-byte data from the client device, the processor 110A refers to the write pointer to write the 512-byte data and dummy data into the sector, and at this time, the sector has the partial state. The merging state indicates that the data stored in the sector is combined with the data loaded from the SSDs 100S. Specifically, if the node 100A receives 512-byte data from the client device, and the sector is storing 512-byte data from the client device, the processor 110A checks if the SSDs 100S has data whose logical address is the same as the logical address of the 512-byte data of the client device. If the SSDs 100S has data whose logical address is the same as the logical address of the 512-byte data of the client device, the processor 110A loads the data from the SSDs 100S, and the processor 110A further writes the loaded data into the sector having the above 512-byte data. That is, the data from the client device and the data loaded from the SSDs 100S corresponding of the same logical address are merged and stored in the sector. If the logical address of the 512-byte data of the client device does not appear in the SSDs 100S, the sector directly enters the need-flush state. The need-flush state indicates that the data stored in the sector can be moved to the SSDs 100S. The flushing state indicates that the processor 110A is moving the data from the sector to the SSDs 100S. The overwritten state indicates that in the process of writing data to the SSDs 100S, the node 100A just receives the updated data from the client, wherein the logical address of the updated data is the same as the logical address of the data flushing into the SSDs 100S. The flush-down state indicates that the data flushing operation of the sector is complete.

By designing the sectors to have the aforementioned states, the processor 100A can refer to the states of the sectors to determine the moving of the write pointer, to use the write buffer and access the SSDs 100S efficiently.

Figure 7:
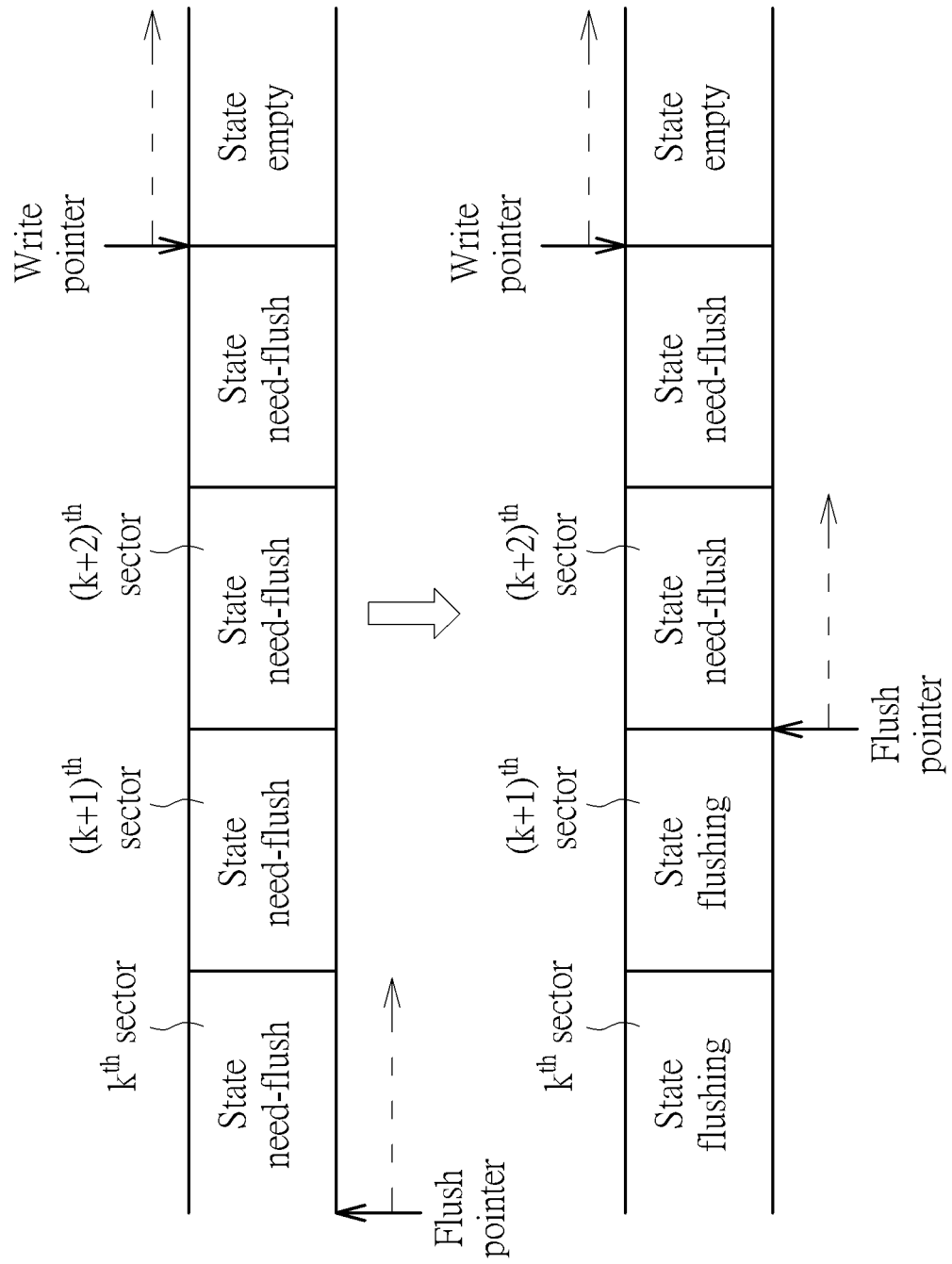
FIG. 7 shows the moving of the flush pointer according to one embodiment of the present invention.

FIG. 7 shows the moving of the flush pointer according to one embodiment of the present invention. As shown in FIG. 7, the k-th sector, the (k+1)-th sector, the (k+2)-th sector have the need-flush states, and the flush pointer is at the beginning of the k-th sector. Then, the processor 110A sequentially moves the data of the k-th sector and the (k+1)-th sector to the SSDs, and the k-th sector and the (k+1)-th are changed to the flushing states. It is noted that the data of the k-th sector and the data of the (k+1)-th may be stored into different SSDs, so the writing speeds may be different so that the (k+1)-th sector may enter the flush-down state sooner that the k-th sector.

Figure 8:
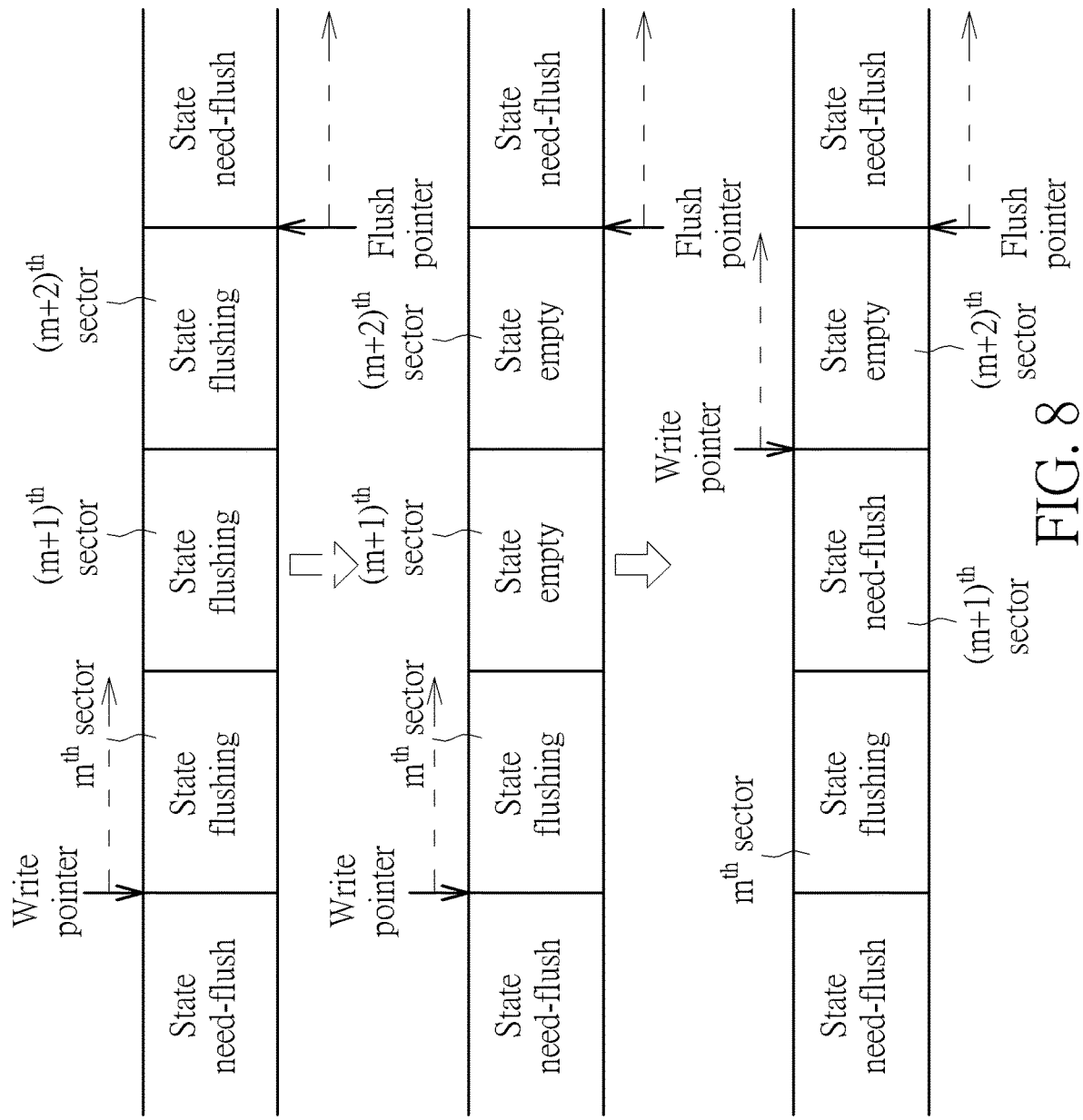
FIG. 8 shows the moving of the flush pointer according to one embodiment of the present invention.

FIG. 8 shows the moving of the flush pointer according to one embodiment of the present invention. As shown in FIG. 8, the m-th sector, the (m+1)-th sector, the (m+2)-th sector have the flushing states, and the write pointer is at the beginning of the m-th sector. Then, if the data of the (m+1)-th sector and the data of the (m+2)-th are moved to the SSDs 100S completely and the (m+1)-th sector and the (m+2)-th become the empty states, but the m-th sector is still in the flushing state, the write pointer can ignore the m-th sector having the flushing state to move to the next sector, and the processor 110A starts to moves the data of the (m+1)-th sector to the SSDs 100S, and the (m+1)-th sector becomes the need-flush state.

In the embodiment shown in FIG. 8, if the processor 110A determines that the write pointer is at the sector having the flushing state, the processor 110A will check if the next sector has the empty state. If the next sector has the empty state, the processor 110A can directly process the next sector to move the data of the next sector to the SSDs 100S, without waiting for the operation of the current sector to complete. Therefore, the use the write buffer 500 will be more efficient. In another embodiment, if the processor 110A determines that the write pointer is at the sector having the flushing state, the processor 110A will check if any sector between the write pointer and the flushing pointer has the empty state, if yes, the processor 110A can ignore the current sector and directly process the sector having the empty state to move the data to the SSDs 100S. For example, if the (m+2)-th becomes the empty states, but the m-th sector and the (m+1)-th are still in the flushing state, the processor 110A can ignore the m-th sector and the (m+1)-th sector to process the (m+2)-th sector.

In one embodiment, the processor 110A can ignore any sector that does not have the merging state. That is, if the m-th sector shown in FIG. 8 has the merging state, the processor 110A cannot ignore the m-th sector even if the (m+1)th sector and the (m+2)th sector have the empty states. Specifically, if the m-th sector shown in FIG. 8 has the merging state, the write point must stay at the m-th sector until the m-th sector enters the need-flush state.

Figure 9:
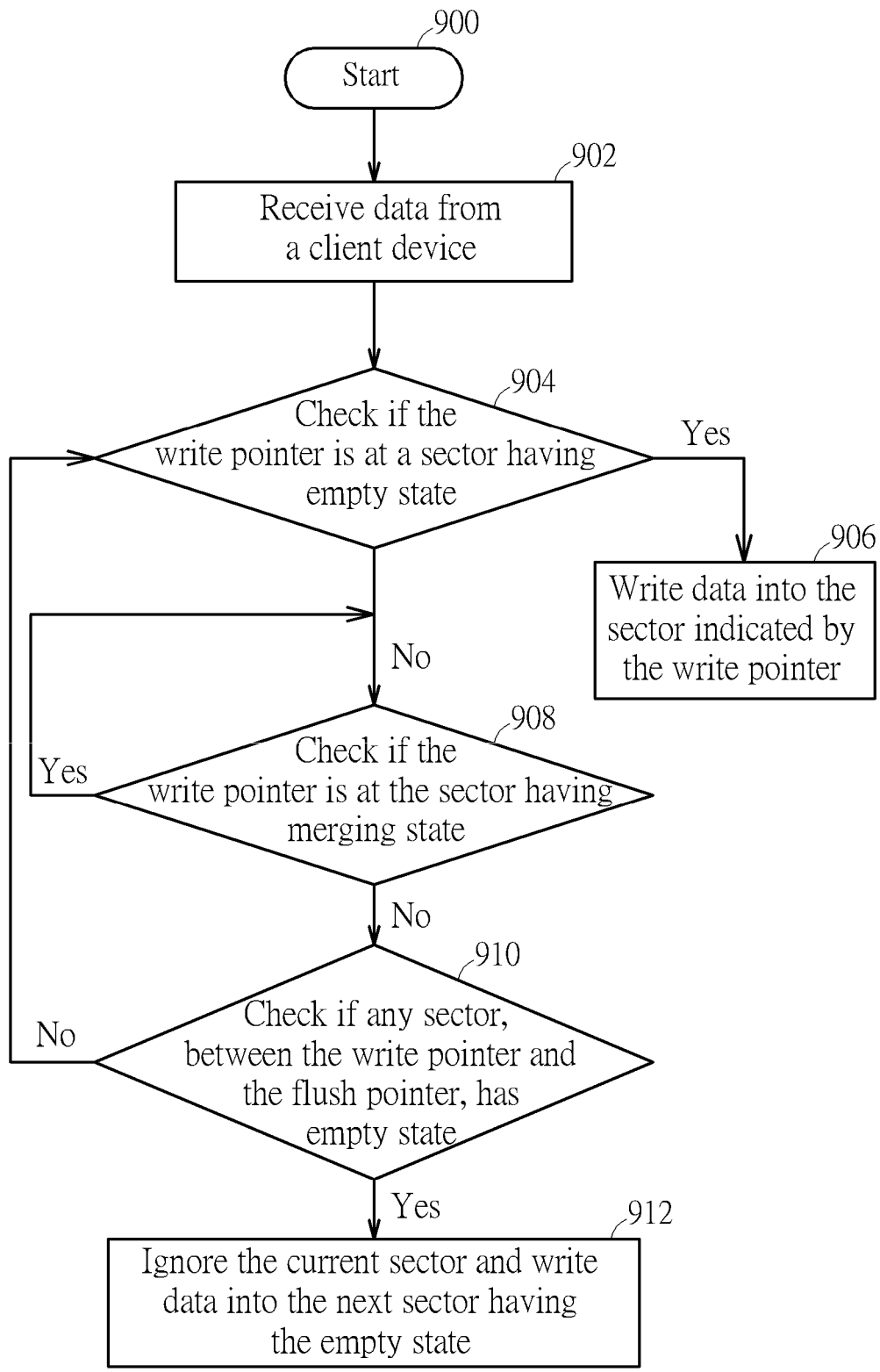
FIG. 9 is a flowchart of a control mechanism of the write buffer according to one embodiment of the present invention.

FIG. 9 is a flowchart of a control mechanism of the write buffer 500 according to one embodiment of the present invention. Referring to the above embodiments of the present invention, the flow is described as follows.

Step 900: the flow starts.

Step 902: receive data from a client device.

Step 904: check if the write pointer is at a sector having empty state. If yes, the flow enters Step 906; and if not, the flow enters Step 908.

Step 906: write data into the sector indicated by the write pointer.

Step 908: check if the write pointer is at the sector having merging state. If yes, the flow stays at Step 908 until the sector indicated by the write pointer has the need-flush state; if not, the flow enters Step 910.

Step 910: check if any sector, between the write pointer and the flush pointer, has empty state. If yes, the flow enters Step 912; if not, the flow goes back to Step 904.

Step 912: ignore the current sector and write data into the next sector having the empty state.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A server, comprising:
   a solid state drive (SSD);
   a node, comprising:
      a network module, configured to communicate with an electronic device via network;
      a processor;
      a memory comprising a ring buffer serving as a write buffer of the node, wherein the write buffer has a plurality of sectors, a size of each sector is equal to a write unit of the another electronic device; and the write buffer has a write pointer for indicating an end of the last written sector, and the write buffer has a flush pointer for indicating the sector whose data is ready for moving into the SSD; and
   wherein the processor sets each sector to have one of a plurality of states comprising an empty state, a merging state, a need-flush state and a flushing state, the sector having the empty state indicates that no data is stored in the sector, the sector having the merging state indicates that processor is loading other data from the SSD and merging the data stored in the sector with the other data loaded from the SSD, the sector having the need-flush state indicates that the sector whose data is ready for moving into the SSD, and the flushing state indicates that the processing is moving data of the sector into the SSD; and the processor further refers to a state of a specific sector indicted by the write pointer to determine whether to ignore the specific sector to directly write data to a sector after the specific sector.

2. The server of claim 1, wherein if the specific sector indicated by the write pointer has the flushing state and there is a sector between the write pointer and the flush pointer having the empty state, the processor directly writes the data from the electronic device into the sector.

3. The server of claim 1, wherein if the specific sector indicated by the write pointer has the state other than the merging state, and there is the sector between the write pointer and the flush pointer having the empty state, the processor directly writes the data from the electronic device into the sector.

4. The server of claim 1, wherein the server is an all flash array (AFA) server, the memory is a dynamic random access memory (DRAM).

5. A control method of a server, wherein the server comprises a write buffer for temporarily storing data from an electronic device, the write buffer has a plurality of sectors, a size of each sector is equal to a write unit of the another electronic device; and the write buffer has a write pointer for indicating an end of the last written sector, and the write buffer has a flush pointer for indicating the sector whose data is ready for moving into a SSD; and the control method comprises:
   setting each sector to have one of a plurality of states comprising an empty state, a merging state, a need-flush state and a flushing state, wherein the sector having the empty state indicates that no data is stored in the sector, the sector having the merging state indicates that processor is loading other data from the SSD and merging the data stored in the sector with the other data loaded from the SSD, the sector having the need-flush state indicates that the sector whose data is ready for moving into the SSD, and the flushing state indicates that the processing is moving data of the sector into the SSD; and referring to a state of a specific sector indicted by the write pointer to determine whether to ignore the specific sector to directly write data to a sector after the specific sector.

6. The control method of claim 5, wherein the step of referring to the state of the specific sector indicted by the write pointer to determine if ignoring the specific sector comprises:

if the specific sector indicated by the write pointer has the flushing state and there is a sector between the write pointer and the flush pointer having the empty state, the processor directly writes the data from the electronic device into the sector.

7. The control method of claim 5, wherein the step of referring to the state of the specific sector indicted by the write pointer to determine if ignoring the specific sector comprises:

if the specific sector indicated by the write pointer has the state other than the merging state, and there is the sector between the write pointer and the flush pointer having the empty state, the processor directly writes the data from the electronic device into the sector.

8. The server of claim 5, wherein the server is an all flash array (AFA) server, the write buffer is a dynamic random access memory (DRAM).

9. A control method of a server, comprising, wherein the server comprises a write buffer for temporarily storing data from another electronic device, the write buffer has a plurality of sectors, a size of each sector is equal to a write unit of the another electronic device; and the write buffer has a write pointer for indicating an end of the last written sector, and the write buffer has a flush pointer for indicating the sector whose data is ready for moving into a SSD;

and the control method comprises:

receiving data from an electronic device;

determining if the write pointer is at a sector having empty state;

if the sector indicated by the write pointer has the empty state, writing the data into the sector;

if the sector indicated by the write pointer does not have the empty state, determining if the write pointer is at the sector having a merging state;

if the sector indicated by the write pointer has the merging state, not writing the data into the write buffer until the sector changes to another state;

if it is determined that the sector indicated by the write pointer does not have the merge state, determining if any sector, between the write pointer and the flush pointer, has the empty state;

if it is determined that a sector between the write pointer and the flush pointer has the empty state, directly writing data into the sector having the empty state.

10. The control method of claim 9, wherein the sector having the empty state indicates that no data is stored in the sector; and the sector having the merging state indicates other data is loaded from the SSD, and the data stored in the sector is merged with the other data loaded from the SSD.

* * * * *